United States Patent [19]

Schaller

[11] Patent Number: 5,689,997

[45] Date of Patent: Nov. 25, 1997

[54] ELECTRIC GEARSHIFT MECHANISM FOR CHANGE-SPEED GEARBOXES OF MOTOR VEHICLES

[75] Inventor: Gerhard Schaller, Koeln-Lovenich, Germany

[73] Assignee: Ford Global Technologies, Inc., Dearborn, Mich.

[21] Appl. No.: 685,735

[22] Filed: Jul. 24, 1996

[30] Foreign Application Priority Data

Jul. 24, 1995 [DE] Germany .................. 195 27 893.3

[51] Int. Cl.[6] ............................................. F16H 61/34
[52] U.S. Cl. ......................... 74/335; 74/89.15; 74/473 R
[58] Field of Search ........................ 74/335, 473 R, 74/89.15

[56] References Cited

U.S. PATENT DOCUMENTS 4,449,416  5/1984  Huitema ................... 74/473 R X
5,205,179  4/1993  Schneider ..................... 74/89.15
5,219,391  6/1993  Edelen et al. ..................... 74/335
5,357,822  10/1994  Lanting et al. .................. 74/473 R

FOREIGN PATENT DOCUMENTS 1 139 758  11/1962  Germany .
33 13803   7/1988   Germany .

Primary Examiner—Charles A. Marmor
Assistant Examiner—Troy Grabow
Attorney, Agent, or Firm—James J. Dottavio

[57] ABSTRACT

An electric gearshift mechanism for a change-speed gearbox of a motor vehicle with selector gates has an electric motor and a gear shifting member. The gear shifting member can be moved in two substantially mutually transverse shifting movements. The gear shifting member includes a threaded spindle having an axis of rotation drivably connected to the motor carrying a nut having a finger for preselecting selector gates. A linear guide conducts the nut along the axis and a clutch rotatably connects the nut and the spindle.

18 Claims, 3 Drawing Sheets

ELECTRIC GEARSHIFT MECHANISM FOR CHANGE-SPEED GEARBOXES OF MOTOR VEHICLES

BACKGROUND OF THE INVENTION

1. Field of the Invention

The invention relates to an electric gearshift mechanism for a change-speed gearbox of a motor vehicle.

2. Description of the Prior Art

An electric gearshift mechanism for change-speed gearboxes of motor vehicles is shown in German Patent 1 139 758 ('758). In the electric gearshift mechanism of the '758 patent, two separate electrical devices are required to accommodate two substantially mutually transverse shifting movements (R=rotation and L=linear) that are necessary. An electromagnet is provided for the rotary movement (R) engaging a lever arm. For the linear movement (L), an electric motor is provided. The motor has a threaded spindle which carries a nut. The nut is held fast against rotation and axially guided.

In the electric gearshift mechanism of the '758 patent, the rotary movement required for the preselection is furnished by an electromagnet, and the linear movement required for engagement is furnished by an electric motor. The preselection movement of the electromagnet enables one of three shift gates to be selected. The movement of the electric motor, the threaded spindle, and the nut make a controlled engagement movement possible through control of the speed of rotation of the electric motor. Two separate control devices are therefore required for these two electric gearshift mechanisms. The mechanism from the '758 patent meets the requirements of the change-speed gearbox, since the gearbox requires a rotary movement for the preselection of the shift gates, and a linear movement for the engagement of the gears.

When a linear movement is required for the preselection in the gearbox, and a rotary movement is required for the engagement, difficulties arise with regard to the desired controlled engagement movement of the different gears. This is particularly true when synchronizing devices are used in an automatic change-speed gearbox, in which case precise control of the variation of the force applied in the engaging movement during upshifts and downshifts is extremely desirable. The present invention endeavors to overcome these difficulties.

SUMMARY OF THE INVENTION

Accordingly, it is an object of the present invention to provide an improved electric gearshift mechanism in which both of the required shifting movements (R and L) are derived from the rotary movement of a threaded spindle. In such a gearshift mechanism, the force applied during the execution of both a rotary movement and a linear movement can be effected through a corresponding single control device for the electric motor driving the threaded spindle. Rotary movement (R) is derived from the threaded spindle by producing, through a clutch, a temporary, controlled non-rotatable connection between the threaded spindle and a linear guide means of a nut driven by the spindle. When the electric motor is correspondingly controlled, this temporary connection enables a desired variation in the applied force provided during the rotary movement.

The linear guide means for the nut may be in the form of a sliding sleeve mounted on the threaded spindle for limited axial and rotary movement. The sliding sleeve has radial clutch surfaces at its ends whereby the sliding sleeve can: Be held stationary by radial clutch surfaces provided on the reduction gearbox; or, Be connected non-rotatably to the threaded spindle by radial clutch surfaces provided on a clutch flange which is connected non-rotatably to the threaded spindle.

In one embodiment of the invention, the clutch surfaces are disposed immediately adjacent to magnet coils. In a second embodiment, the sliding sleeve has an annular groove at one end, engaging into which is a selector fork which can be actuated directly by the armature of an electromagnet. In a third embodiment of the invention, the linear guide means for the nut is in the form of a sliding sleeve mounted on the threaded spindle which is capable of limited axial and rotary movement. This sliding sleeve has clutch tooth systems at its ends through which said sleeve can alternately: (1) Be held stationary by a clutch tooth system provided on projecting sleeve fixed on the reduction gearbox; or, (2) Be connected non-rotatably to the threaded spindle by a clutch tooth system formed in the manner of a synchronizer cone. Furthermore, the clutch tooth system of the third alternative is provided on a clutch flange connected non-rotatably to the threaded spindle, and a portion of the sliding sleeve directly forms the armature of an electromagnet.

DESCRIPTION OF THE PREFERRED EMBODIMENTS

Figure 1:
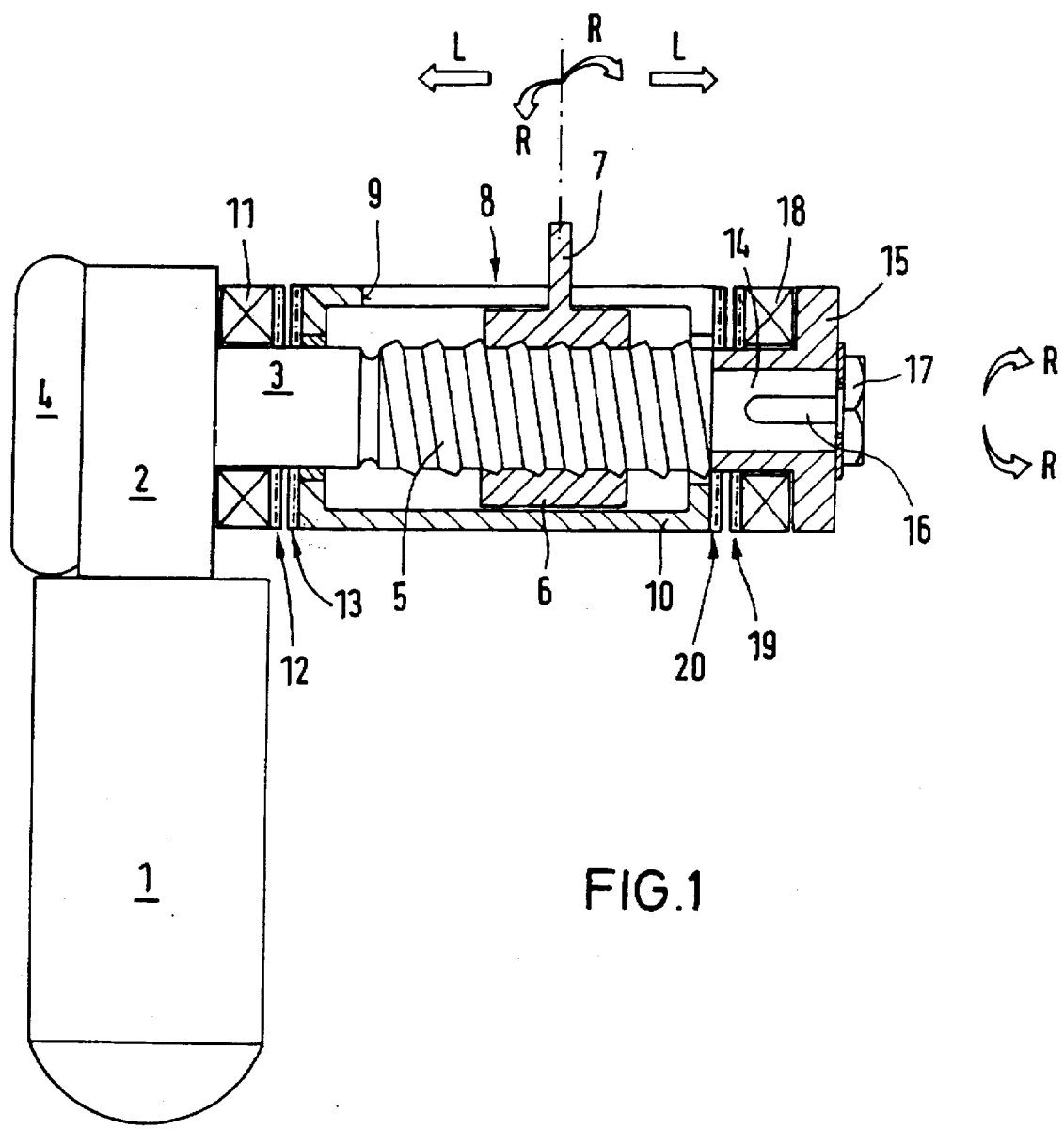
FIG. 1 shows an embodiment of an electric gearshift mechanism according to the invention.

An electric gearshift mechanism for a change-speed gearbox of a motor vehicle consists of a direct current motor 1 having a reduction gearbox 2 flanged directly onto it an output shaft 3. Associated with the reduction gearbox 2 is a position or angle sensor 4 which, in combination with an appropriate electronic control device, monitors the control of the electric motor 1. The output shaft 3 is connected to a threaded spindle 5 in a manner not shown. Alternatively, output shaft 3 is integral with threaded spindle 5. A nut 6 is mounted on the threaded spindle 5. The nut 6 carries a radially projecting selector finger 7. Further, nut 6 is held fast against rotation but axially movable within a linear guide 8. The linear guide 8 may be formed in a particularly simple manner by providing an elongate slot 9 in a tubular sliding sleeve 10. Sleeve 10 then receives nut 6 in its interior.

A magnet coil 11 is provided adjacent the end of the threaded spindle 5, connected to the reduction gearbox 2. Coil 11 is provided with a radial clutch surface 12 which can cooperate with a correspondingly formed counter clutch surface 13 provided on the end face of the sliding sleeve 10. On the two clutch surfaces 12 and 13, radial flat tooth systems are provided, which, with a minimal stroke of the sliding sleeve 10, form a positive connection to the magnet coil 11 and consequently to the fixed reduction gearbox 2. At the other, free end 14 of the threaded spindle 5, a clutch flange 15 is connected non-rotatably to the threaded spindle 5 by means of a key 16 and a screw 17. A second magnet coil 18 is fitted non-rotatably on the clutch flange 15 and is provided with a radial clutch surface 19. The clutch surface 19 can cooperate with a correspondingly formed radial clutch surface 20 on the opposing end of the sliding sleeve 10.

In the embodiment shown in FIG. 1 the sliding sleeve 10 is supported at one end by the end of the threaded spindle 5 and at the other end by the outer periphery of the nut 6. For the sake of clarity, sleeve 10 is shown in a middle position where it resides only for a short time in each changeover phase. The sliding sleeve 10 is displaced to the right by switching on magnet coil 18. In this way, radial clutch surfaces 19 and 20 produce a non-rotatable connection between the threaded spindle 5 and the sliding sleeve 10 via the clutch flange 15. The longitudinal slit 9 guides the selector finger 7 along in a rotary movement R whereby the selector finger 7 preselects one of several selector gates of the change-speed gearbox.

Immediately after the rotary movement to preselect a gate, magnet coil 18 is switched off and magnet coil 11 is turned on. Thus, the sliding sleeve 10 is moved to the left, whereby the radial clutch surfaces 13 and 12 produce a non-rotatable connection with the fixed housing of the reduction gearbox 2. When the threaded spindle 5 is turned in a controlled manner, an axial, linear movement L is effected in the nut 6. This moves the selector finger 7 in the longitudinal slit 9, thus allowing the engagement of a gear.

It can readily be seen that, by appropriate switching over between the two magnet coils 11 and 18 and appropriate control of the electric motor 1, controlled angular movements R and corresponding controlled linear movements L of the selector finger 7 can be obtained. By means of an electronic controller for the electric motor as is well known in the art, the variation in the force applied during the movements being carried out can be very precisely controlled and monitored.

Figure 2:
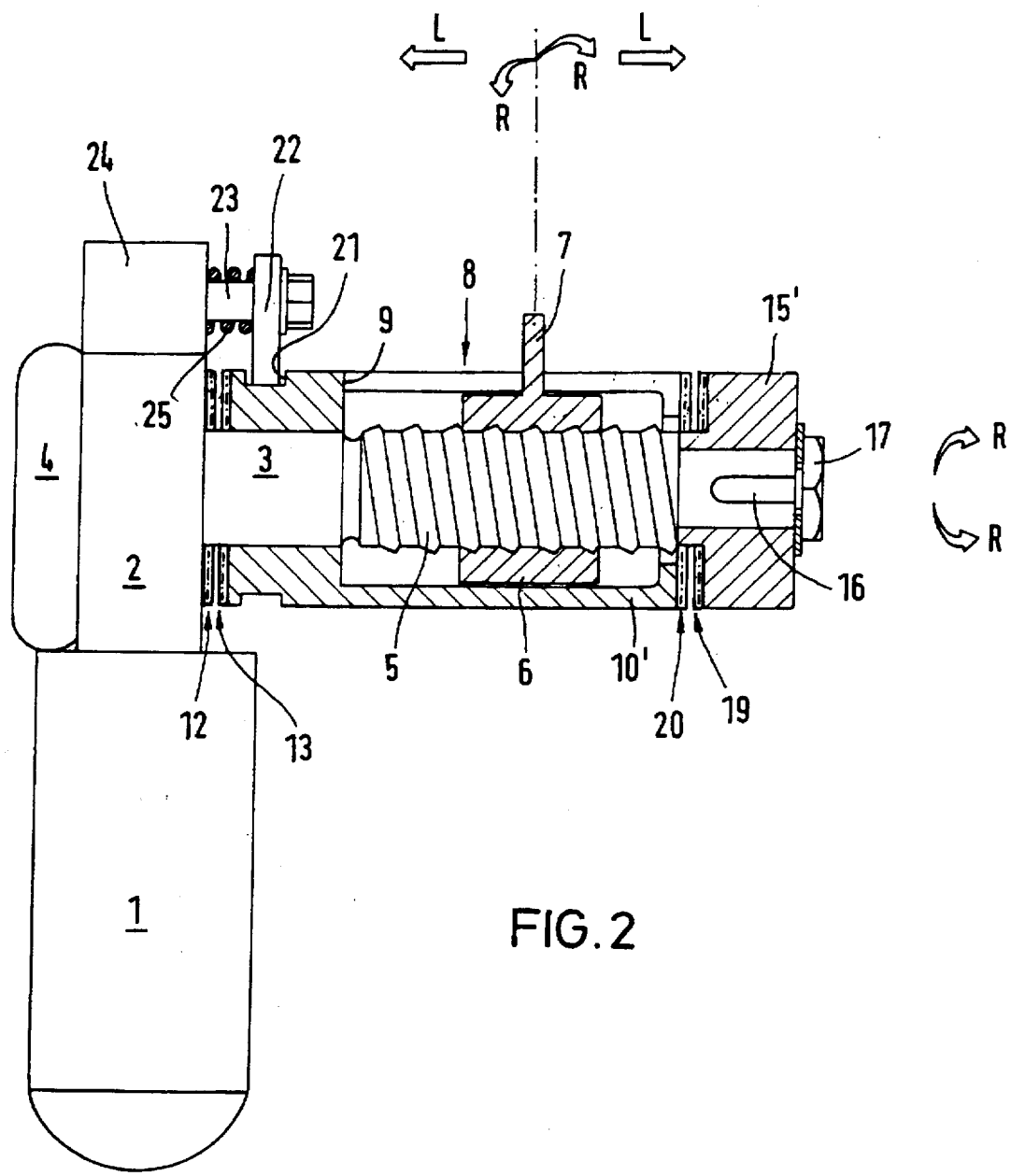
FIG. 2 shows a further embodiment of an electric gearshift mechanism according to the invention.

In the embodiment shown in FIG. 2, the same components are given the same reference numerals, and components which are functionally the same but structurally modified are given reference numerals with an added prime notation. Differences between the first and second embodiments include sliding sleeve 10', clutch flange 15' and the arrangement of the magnet coils. More specifically, sliding sleeve 10' is provided with an annular groove 21 on its end adjacent the reduction gearbox 2, in which a shifter fork 22 engages the sleeve 10'. The shifter fork 22 carries the armature 23 of a solenoid 24, which is urged out of its coil by means of a spring 25. Similarly, armature 23 is drawn back into the solenoid 24, to the left as seen in FIG. 2, when the coil is energized. Thus, when the solenoid 24 is not activated, the spring 25 moves the sliding sleeve 10' towards the clutch flange 15', thereby forming a non-rotatable connection via the radial clutch surfaces 19 and 20. Thus, by rotating the threaded spindle 5, a rotary movement R of sleeve 10' can be effected.

When the solenoid 24 is activated, the armature 23 is drawn into the coil and the shifter fork 22 slides the sliding sleeve 10' to the left, as seen in FIG. 2. This action forms a non-rotatable connection with the fixed housing of the reduction gearbox 2 by way of the radial clutch surfaces 12 and 13. Thus, when the threaded spindle 5 rotates, the sliding sleeve 10' is restrained from rotation and the rotation of the threaded spindle 5 leads to a linear movement of the nut 6. Consequently, the selector finger 7 carries out a desired linear movement L for engagement of a gear speed.

Figure 3:
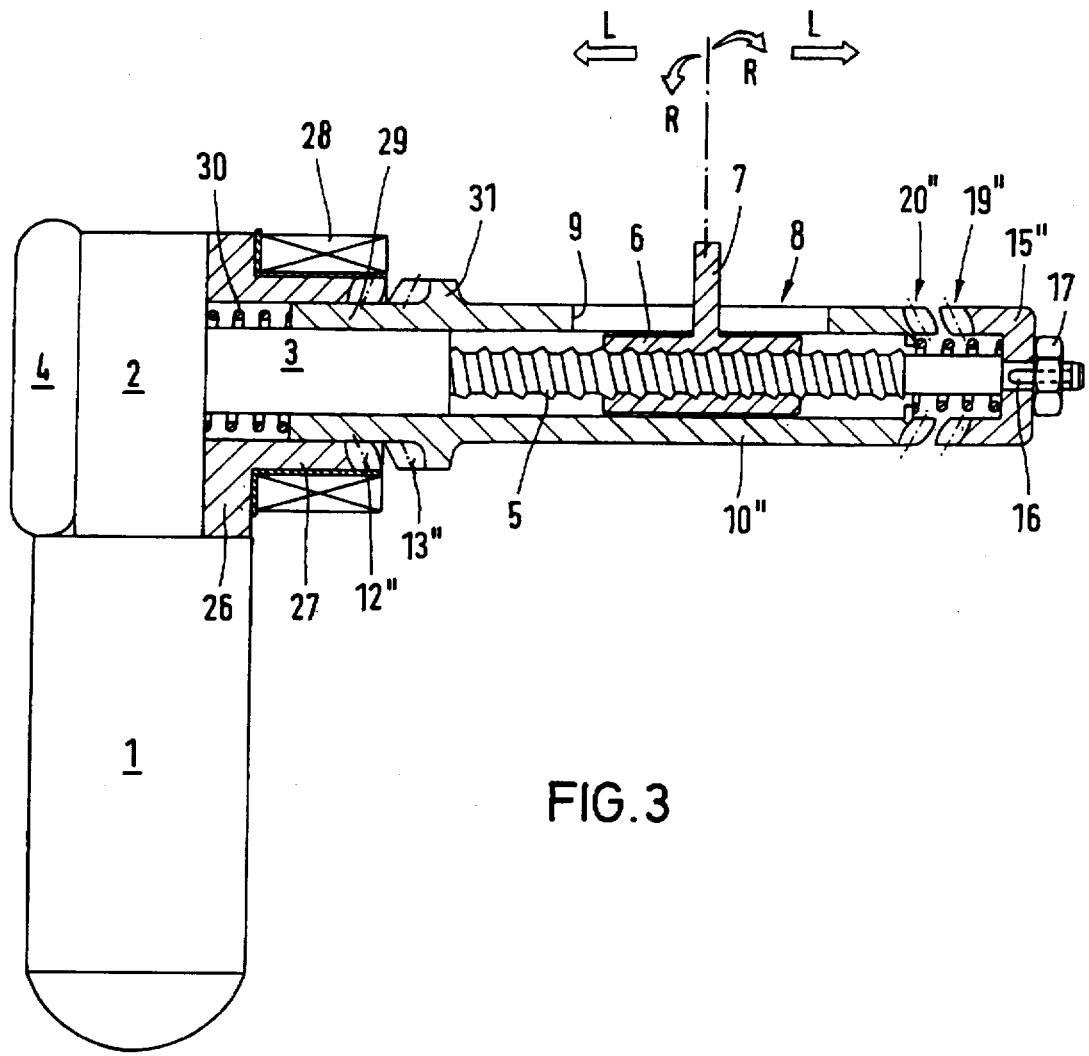
FIG. 3 shows a third embodiment of an electric gearshift mechanism according to the invention.

In the embodiment shown in FIG. 3, corresponding components are again similarly designated, and components which are functionally the same but structurally modified are given reference numerals with an added double prime notation. A flange 26 with a projecting sleeve 27 is arranged concentrically with the end of threaded spindle 5. Projecting sleeve 27 carries a magnet coil 28. The sliding sleeve 10" is provided at its left hand end with an extension 29 which extends into the projecting sleeve 27. A coil spring 30 inside the projecting sleeve 27 urges the sliding sleeve 10" to the right so that a non-rotatable connection between the sleeve 10" and the clutch flange 15" is again produced. In this embodiment, however, the radial clutch surfaces 19" and 20" are provided with a tooth system like those in a synchronizer cone clutch. When the sliding sleeve 10" is pushed to the right by the spring 30, a non-rotatable connection between the threaded spindle 5 and the sliding sleeve 10" again results, and a rotary movement R of sleeve 10" is again performed.

A sleeve extension 29 is provided at the second end of the sliding sleeve 10". Adjacent this sleeve extension 29, and on an annular shoulder 31 of the sliding sleeve 10", a clutch tooth system 13" is formed in a manner similar to a known synchronizer cone clutch. In a similar manner, a clutch tooth system 12" is formed on the projecting sleeve 27. When the magnet coil 28 is energized, the sleeve extension 29 of the sliding sleeve 10" acts as the armature of this solenoid arrangement and draws the sliding sleeve 10" to the left, as seen in FIG. 3. This action forms a non-rotatable connection between the flange 26 fixed to the reduction gearbox 2 and the projecting sleeve 27 and the sliding sleeve 10". Consequently, a rotation of the threaded spindle 5 again leads to a linear movement of the nut 6 and the selector finger 7 in the linear direction L.

The embodiments of an electric gearshift mechanism according to the invention shown in FIGS. 1, 2, and 3 only constitute examples of advantageous embodiments. The form of the linear guide means for the nut and the form of the radial clutch surfaces and their positively engaging clutch tooth systems can be varied in many suitable ways by one skilled in the art without departing from the spirit and scope of the present invention. Although a preselection movement for shifting a change-speed gearbox is always described herein with a radial movement and an engaging movement with a linear movement, it is wholly within the spirit and scope of the present invention for the preselection movement to take place by a linear movement and the engaging movement of the change-speed gearbox be performed with a radial movement. The essence and particular advantage of the present invention are that the two movements, i.e. both the rotary movement and the linear movement, can be controlled very precisely and variably. That is, the movements can be controlled with respect to the variation of the force they apply by deriving them directly from the threaded spindle driven by a single electric motor. Thus, the corresponding operation of synchronizing devices in a change-speed gearbox can take place with correspondingly adapted forces.

Although the preferred embodiments of the present invention have been disclosed, various changes and modifications may be made without departing from the scope of the invention as set forth in the appended claims.

I claim:

1. An electric gearshift mechanism for a change-speed gearbox with selector gates for a motor vehicle comprising:
    an electric motor; and
    a gear shifting member for providing two substantially mutually transverse shifting movements, said member including a threaded spindle having an axis of rotation drivably connected to said motor; a nut carried by said spindle having a finger for preselecting selector gates; linear guide means for guiding said nut along said axis;

and, clutch means for connecting said nut and said spindle to rotate together so as to rotate the finger.

2. The electric gearshift mechanism of claim 1 wherein said linear guide means comprises a sliding sleeve mounted coaxial said threaded spindle fixed against rotation by said clutch means, said sleeve having an axial slot engaged by said finger to prevent rotation of said nut with respect to said sleeve.

3. The electric gearshift mechanism of claim 2 wherein said clutch means comprises:
  a first clutch surface fixed against rotation with respect to said motor; and
  a second clutch surface provided on said sliding sleeve adjacent said first clutch surface wherein said sliding sleeve is held against rotation by the engagement of said first and said second clutch surfaces.

4. The electric gearshift mechanism of claim 3 further comprising an energizable magnet coil provided immediately adjacent one of the group comprising said first and second clutch surfaces, wherein said magnet coil effects the engagement of said first and said second clutch surfaces when said coil is energized.

5. The electric gearshift mechanism of claim 3 further comprising:
  a solenoid having an armature, said solenoid being fixably connected with respect to said motor;
  a shifter fork carried by said armature; and
  groove means defining a groove formed on said sliding sleeve in which a first end of said fork cooperates wherein said fork and sleeve are moved axially when said solenoid is energized to engage said first and said second clutch surfaces.

6. The electric gearshift mechanism of claim 5 further comprising a spring mounted on said armature which urges said armature out of said solenoid.

7. The electric gearshift mechanism of claim 3 wherein said clutch means comprises:
  a third clutch surface connected non-rotatably to said threaded spindle; and
  a fourth clutch surface provided on said sliding sleeve adjacent said third clutch surface wherein said sliding sleeve is releasably and non-rotatably connected to said threaded spindle by the engagement of said third and fourth clutch surfaces.

8. The electric gearshift mechanism of claim 7 further comprising an energizable magnet coil provided immediately adjacent one of the group comprising said third and fourth clutch surfaces, said magnet coil effecting the engagement of said third and said fourth clutch surfaces when said coil is energized.

9. The electric gearshift mechanism of claim 7 further comprising:
  a solenoid having an armature, said solenoid being fixably connected with respect to said motor;
  a shifter fork carried by said armature; and
  groove means defining a groove formed on said sliding sleeve in which a first end of said fork cooperates wherein said fork and sleeve are moved axially when said solenoid is energized, to engage said third and fourth clutch surfaces.

10. The electric gearshift mechanism of claim 2 wherein said clutch means comprises:
  a projecting sleeve fixed against rotation with respect to said motor;
  a first clutch surface provided on said projecting sleeve; and
  a second clutch surface provided on said sliding sleeve adjacent said first clutch surface wherein said sliding sleeve is held against rotation by the engagement of said first and said second clutch surfaces.

11. The electric gearshift mechanism of claim 10 further comprising a magnet coil carried by said projecting sleeve, said magnet coil causing said sliding sleeve to act as an armature of a solenoid for moving said sliding sleeve, wherein said first and said second clutch surfaces are engaged when said magnet coil is energized.

12. The electric gearshift mechanism of claim 11 further comprising a spring mounted on said sliding sleeve adjacent said magnet coil which urges said first and second clutch surfaces out of engagement.

13. The electric gearshift mechanism of claim 11 further comprising:
  a third clutch surface provided on said threaded spindle; and
  a fourth clutch surface provided on said sliding sleeve adjacent said third clutch surface wherein said sliding sleeve is releasably and non-rotatably connected to said threaded spindle by the engagement of said third and said fourth clutch surfaces.

14. The electric gearshift mechanism of claim 13 further comprising a magnet coil carried by said projecting sleeve, said magnet coil causing said sliding sleeve to act as an armature of a solenoid for moving said sliding sleeve, wherein said third and said fourth clutch surfaces are engaged when said magnet coil is energized.

15. An electric gearshift mechanism for a change-speed gearbox with selector gates for a motor vehicle comprising:
  an electric motor; and
  a gear shifting member that can be moved in two necessary and substantially mutually transverse shifting movements, said gear shifting member including a threaded spindle having an axis of rotation drivably connected to said electric motor, a nut carried by said threaded spindle having a finger for preselecting selector gates, linear guide means for guiding said nut axially and holding said nut fast against rotation to derive a linear movement, and clutch means for releasably and non-rotatably connecting said motor and said guide means to derive a rotary movement of the finger.

16. The electric gearshift mechanism of claim 15 wherein:
  said linear guide means comprises a sliding sleeve mounted on said threaded spindle;
  said clutch means comprises a first clutch surface fixed against rotation to said motor, second and third clutch surfaces disposed at opposite ends of said sliding sleeve, respectively, and a fourth clutch surface provided on said sliding sleeve adjacent said third clutch surface; and
  said gear shifting member further comprises a first magnet coil disposed adjacent said first and second clutch surfaces and a second magnet coil disposed adjacent said third and fourth clutch surfaces, wherein said first and second magnet coils are alternately energized to effect the following two states, respectively, a first state wherein said first magnet coil effects the engagement of said first and second clutch surfaces when said first magnet coil is energized whereby said sliding sleeve is held stationary, and a second state wherein said second magnet coil effects the engagement of said third and fourth clutch surfaces when said second magnet coil is energized whereby said sliding sleeve is connected non-rotatably to said threaded spindle.

17. The electric gearshift mechanism of claim 15 wherein:

said linear guide means comprises a sliding sleeve mounted on said threaded spindle;

said clutch means comprises a first clutch surface fixed against rotation to said motor, second and third clutch surfaces disposed at opposite ends of said sliding sleeve, respectively, and a fourth clutch surface provided on said sliding sleeve adjacent said third clutch surface; and said gear shifting member further comprises a solenoid having an armature, said solenoid being fixably connected with respect to said motor, a shifter fork carried by said armature, and groove means defining a groove formed on said sliding sleeve in which a first end of said fork cooperates wherein said fork and sleeve are moved axially when said solenoid is energized to effect the following two states, respectively, a first state wherein said first and second clutch surfaces are engaged whereby said sliding sleeve is held stationary, and a second state wherein said third and fourth clutch surfaces are engaged whereby said sliding sleeve is connected non-rotatably to said threaded spindle.

18. The electric gearshift mechanism of claim 15 wherein:

said linear guide means comprises a sliding sleeve mounted on said threaded spindle;

said clutch means comprises a projecting sleeve fixed against rotation with respect to said motor, a first clutch surface provided on said projecting sleeve, a second clutch surface provided on said sliding sleeve adjacent said first clutch surface, a third clutch surface provided on said threaded spindle, and a fourth clutch surface provided on said sliding sleeve adjacent said third clutch surface; and said gear shifting member further comprises a magnet coil carried by said projecting sleeve, said magnet coil causing said sliding sleeve to act as an armature of a solenoid for moving said sliding sleeve to effect the following two states, respectively, a first state wherein said first and second clutch surfaces are engaged whereby said sliding sleeve is held stationary, and a second state wherein said third and fourth clutch are engaged whereby said sliding sleeve is connected non-rotatably to said threaded spindle.

* * * * *